United States Patent
Stokes

(10) Patent No.: US 8,205,092 B2
(45) Date of Patent: Jun. 19, 2012

(54) TIME-BASED METHOD FOR AUTHORIZING ACCESS TO RESOURCES

(75) Inventor: Randall K. Stokes, Provo, UT (US)

(73) Assignee: Novell, Inc., Provo, UT (US)

( * ) Notice: Subject to any disclaimer, the term of this patent is extended or adjusted under 35 U.S.C. 154(b) by 899 days.

(21) Appl. No.: 11/768,755

(22) Filed: Jun. 26, 2007

(65) Prior Publication Data
US 2009/0007229 A1    Jan. 1, 2009

(51) Int. Cl.
G06F 21/00    (2006.01)
(52) U.S. Cl. ........................................ 713/182
(58) Field of Classification Search .................. 713/182
See application file for complete search history.

(56) References Cited

U.S. PATENT DOCUMENTS

| | | | | |
|---|---|---|---|---|
| 5,809,230 A * | 9/1998 | Pereira | | 726/35 |
| 6,233,576 B1 * | 5/2001 | Lewis | | 1/1 |
| 6,647,388 B2 * | 11/2003 | Numao et al. | | 1/1 |
| 2002/0116539 A1 * | 8/2002 | Bryczkowski et al. | | 709/317 |
| 2002/0157015 A1 * | 10/2002 | Gilbert et al. | | 713/200 |
| 2003/0091042 A1 * | 5/2003 | Lor | | 370/389 |
| 2003/0161473 A1 * | 8/2003 | Fransdonk | | 380/277 |
| 2005/0060580 A1 * | 3/2005 | Chebolu et al. | | 713/201 |
| 2006/0005036 A1 * | 1/2006 | Hu et al. | | 713/182 |
| 2007/0186106 A1 * | 8/2007 | Ting et al. | | 713/168 |
| 2008/0289036 A1 * | 11/2008 | Kandasamy et al. | | 726/21 |

OTHER PUBLICATIONS

"Windows Vista: Features Explained: Parental Controls"; http://www.microsoft.com/windows/products/windowsvista/features/details/parentalcontrols.mspx; Printed on Apr. 16, 2007; 2 pages.

* cited by examiner

*Primary Examiner* — Michael S McNally
(74) *Attorney, Agent, or Firm* — Marger Johnson & McCollom PC

(57) ABSTRACT

Upon receiving a request for access to a resource, a current clock value is determined. Based on information including the resource, the identity of the user requesting the access, and the current clock value, the system identifies applicable access controls. If the applicable access controls indicate that the user can be granted access to the resource at the current time, the request is granted. Otherwise, the request is denied.

31 Claims, 11 Drawing Sheets

405

```
Resource: Resource 1
    User Identifier: User Identifier 1
        Access Control Structure: ACS 1
        Access Control Structure: ACS 2
    User Identifier: User Identifier 2
        Access Control Structure: ACS 3
            ⋮
```

```
Resource: Resource 1
    User Identifier: User Identifier 1
        Access Level: Read/Write
            Access Control Structure: ACS 1
        Access Level: Read
            Access Control Structure: ACS 2
    User Identifier: User Identifier 2
        Access Level: Read/Write
            Access Control Structure: ACS 3
                ⋮
```

FIG. 4B

TIME-BASED METHOD FOR AUTHORIZING ACCESS TO RESOURCES

FIELD OF THE INVENTION

This invention pertains to resource access in a computer system, and more particularly to allowing access to resources based on the current date/time.

BACKGROUND OF THE INVENTION

Modern computer systems provide different means for controlling access to resources. File systems are a good example of such access control systems. For example, the UNIX® file system provides different levels of access controls to individual files, based on whether the user is an owner of the file, in the same group as the file, or someone else. (UNIX is a registered trademark of the Open Group.) Within each level (owner, group, or other), access control can include distinct levels of control to read, write, and execute the file. A user might grant himself or herself permission to read and write to the file, grant users in the same group permission to read the file, but not write to it, and grant others no permissions at all.

But these permissions are constant in time. The UNIX file system does not provide any ability to control access to files based on time.

A need remains for a way to provide for access control to files and other resources that addresses these and other problems associated with the prior art.

SUMMARY OF THE INVENTION

In an embodiment of the invention, a resource can be accessed via a machine. Associated with the resource and a user identifier is an access control structure, which identifies times and/or dates during which the user identified by the user identifier can access the resource. The access control structure can also define what level of access the user is granted.

When the user requests access to the resource, the current date and/or time are determined. The current date and/or time are used in conjunction with the access control structure to determine what level of access, if any, the user is granted.

The foregoing and other features, objects, and advantages of the invention will become more readily apparent from the following detailed description, which proceeds with reference to the accompanying drawings.

BRIEF DESCRIPTION OF THE DRAWINGS

FIGS. 4A-4B show alternative embodiments or organizing the resource, access control structures, and user identifiers of FIG. 3.

DETAILED DESCRIPTION OF THE PREFERRED EMBODIMENT

Figure 1:
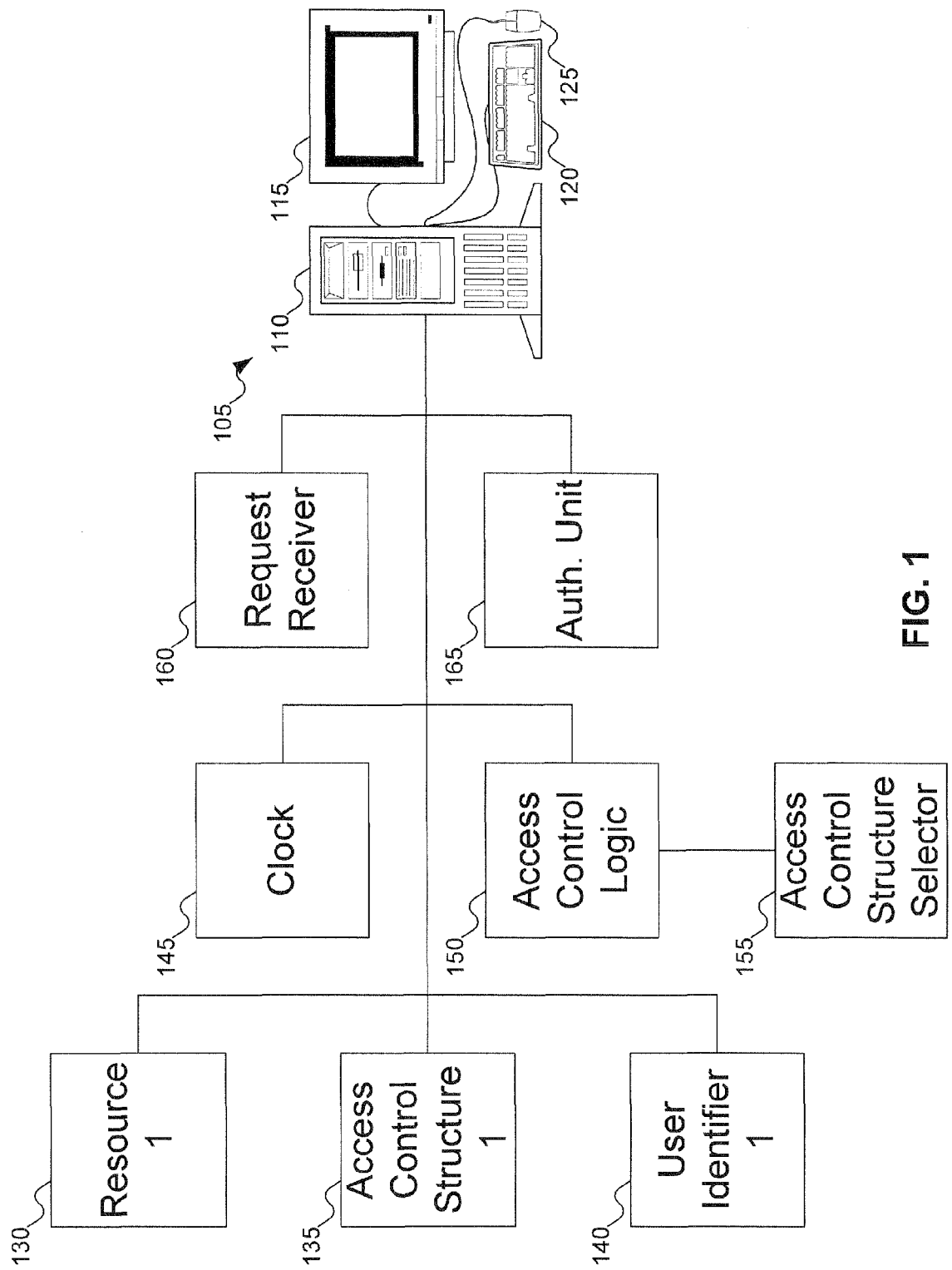
FIG. 1 shows a computer system including a resource with a time-based access control, according to an embodiment of the invention.

FIG. 1 shows a computer system including a resource with a time-based access control, according to an embodiment of the invention. In FIG. 1, computer system 105 is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105; for example, a central processing unit, memory, etc. Finally, although computer system 105 is shown standing alone, a person skilled in the art will recognize that computer system 105 can interact with other computer systems, either directly or over a network of any type, as shown and discussed below with reference to FIG. 7.

Computer system 105 also includes resource 130. Resource 130 is a resource to which a user wants access. Resource 130 can be a file, such as an application or data file, on computer system 105. Resource 130 can also be a resource connected to computer system 105, such as a printer, an external storage (e.g., a file server), or any other type of resource to which a user might want access.

Access control structure 135 (which is sometimes called just an "access control") is an object that identifies particular access levels that can be associated with particular dates and/or times. More detail about access control structure 135 is shown and discussed below with reference to FIGS. 2A-3.

User identifier 140 is an identifier of a user requesting access to resource 130. In combination with access control structure 135, user identifier 140 is used to determine whether or not a user request for access to resource 130 is to be granted. While user identifier 140 typically identifies an individual user, user identifier 140 can also identify a group of users (for example, the members of the accounting department); when user identifier 140 identifies a group, it is considered a surrogate for the entries that would be used for the individual members of the group.

Clock 145 provides the current clock value. While the term "clock" might suggest that clock 145 only provides a time value (that is, the hour of the day), clock 145 can also provide a date value as part of the current clock value. For example, many modern computer clocks operate by measuring time relative to a particular start value (such as Jan. 1, 1980, 12:00: 00 AM). Measuring time relative to a particular time and date enables determining not only the current time of the day, but also the current calendar date.

Access control logic 150 is responsible for using the available information (such as access control structure 135, user identifier 140, and clock 145) to determine whether or not to grant a user's request for access to resource 130. Access control logic 150 can include access control structure selector 155, which is responsible for selecting appropriate access control structures 135 in determining whether or not to grant a user's request for access to resource 130. For example, one access control structure can permit a particular user access to both read to and write from a file during business hours (8:00 AM to 5:00 PM), with a different access control structure permitting that same user access to read from the file, but not write to the file outside business hours. Access control structure selector 155 can use the current value of clock 145 to select the appropriate access controls.

Request receiver 160 receives requests from users to access resources such as resource 130. Request receiver 160 then passes received requests to access control logic 150 to determine whether or not the request should be granted.

Authorization unit 165 is responsible for determining whether the user is authorized to use the machine. Authorization unit 165 is used when the user logs in to computer system 105. Typically, at login time, the user provides a credential: for example, a login ID, such as a username, and a password. Authorization unit 165 is then used to determine whether the provided credential is recognized. If the credential is recognized, then the user is granted access to computer system 105; otherwise the user is denied access to computer system 105.

Typically, authorization unit 165 is used only at the time the user logs in to computer system 105. Once the user is logged in to computer 105, embodiments of the invention rely on access control structure 135 to determine whether the user is granted access to resource 130.

A person skilled in the art will recognize that there is a distinction between using access control structure 135 to control access to resource 130, and providing time limits to when a user can log in to computer system 105. For example, Microsoft® Windows Vista™ offers a parental control feature, which allows a parent to determine the times of day in which a child can log in to the computer. (Microsoft is a registered trademark of Microsoft Corporation in the United States and other countries; Windows Vista is a trademark of Microsoft Corporation in the United States and other countries.) Outside of the times the parent has permitted the child to log into the computer, the child is not permitted to log in to the computer, and cannot use the computer. This allows the parent greater control over the child's use of the computer, without the parent having to enforce household policy in person, and is equivalent to a time-based authorization control, similar to the use of authorization unit 165. But once the child has logged in to the computer, the child is granted the full rights his account permits: the parent does not have the ability to selectively control which applications or data on the computer the child can access.

In contrast to parental control as offered by Microsoft Windows Vista, access control structure 135 enables a parent to permit the child to log into computer 135 but only use certain applications or data depending on the time or day, the day of the week, or the calendar date. Thus, while the parental control elements of Microsoft Windows Vista offer functionality that is related to embodiments of the invention, embodiments of the invention offer capabilities that are significantly distinct from simple parental control.

Returning now to access control structure 135, there can be multiple access control structures 135, each offering a different level of access, using time-based limitations. These different access control structures 135 can be used to control access to resource 130, as desired. Consider, for example, an accounting folder that holds confidential accounting data. Corporate policy might dictate that read/write access to the accounting folder is available only during normal business hours. But there might be an employee in the accounting department who needs extended access to the folder, to be able to conduct reviews of the accounting data outside normal business hours. Further, the company might be having an auditor perform an audit of the accounting data: the auditor needs read/write access to the accounting folder, but only during normal business hours, and only for a two-week interval (while the audit is occurring). Each of these policies can be implemented using a different access control structure 135, as shown in FIGS. 2A-2C.

Figure 2A:
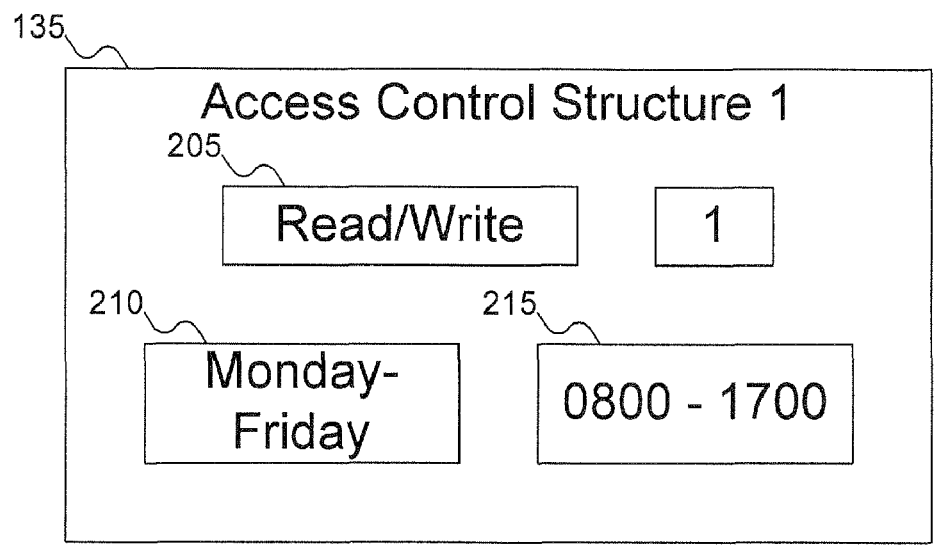
FIGS. 2A-2C show example implementations of time-based access controls using the access control structure of FIG. 1.

In FIG. 2A, access control structure 135 implements the normal business hours policy. Access level 205 is set to grant read/write access to the resource. The policy applies Monday through Friday (date value 210), between the hours of 8:00 AM and 5:00 PM (time value 215).

Figure 2B:
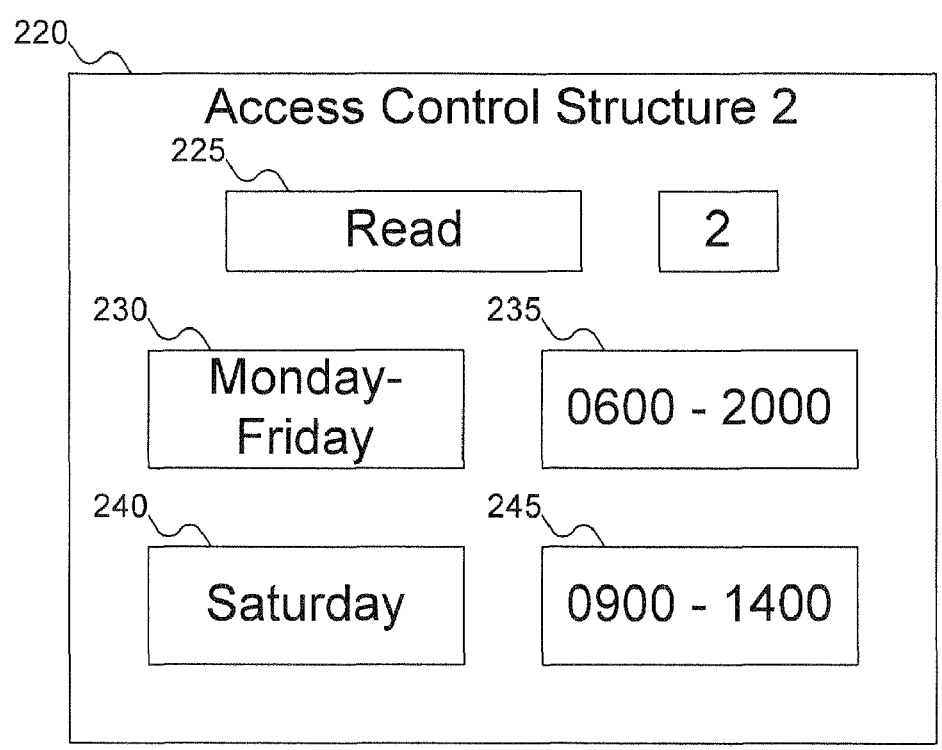

In FIG. 2B, access control structure 220 implements the extended hours policy. Access level 225 is set to read-only access to the resource. The policy applies Monday through Friday (date value 230) between the hours of 6:00 AM and 8:00 PM (time value 235), and on Saturday (date value 240) between the hours of 9:00 AM and 2:00 PM (time value 245).

Figure 2C:
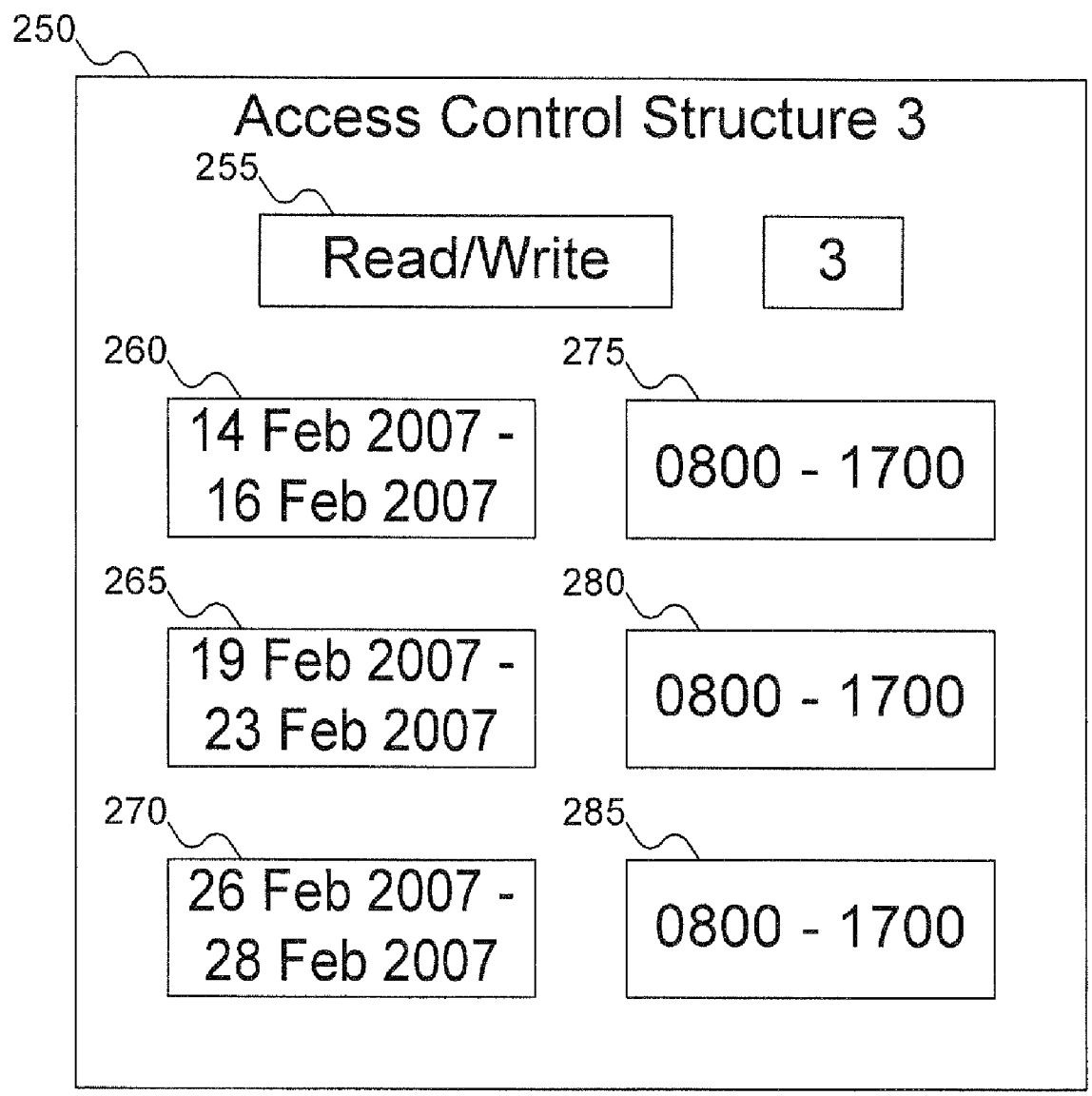

In FIG. 2C, access control structure 250 implements the audit policy. Access level 255 is set to read/write access to the resource. The policy applies weekdays between Feb. 14, 2007 and Feb. 28, 2007 (date values 260, 265, and 270), between the hours of 8:00 AM and 5:00 PM (time values 275, 280, and 285).

A person skilled in the art might notice that access control structures 135 and 220 provide "conflicting" levels of access, in that between 8:00 AM and 5:00 PM Monday through Friday, both read/write and read-only access are specified. This "conflict" can be resolved using any desired approach. In one embodiment of the invention, "conflicts" are resolved by identifying the level of access requested by the user. If there is any access control structure that grants the user the requested level of access, the requested level of access is granted. In this embodiment, because access control structure 135 grants a greater level of access than access control structure 220, between 8:00 AM and 5:00 PM Monday through Friday, access control structure 135 "trumps" access control structure 220: a user governed by both access control structures would be granted write access if he or she requests write access at those times, even though access control structure 220 would not grant such a level of access. In another embodiment, the system can detect conflicting levels of access and alert the administrator (or other person responsible for establishing the access control structures) to manually correct the problem. For example, instead of granting read-only access between 6:00 AM and 8:00 PM Monday through Friday, access control structure 220 could grant read-only access between 6:00 AM and 8:00 AM and between 5:00 PM and 8:00 PM Monday through Friday: this alternative formulation would not create a conflict.

In FIGS. 2A-2C, the times used to control access to the resource are all considered local times. The examples of FIGS. 2A-2C are presented in this manner for simplicity of understanding. The use of a local time zone can be a natural consequence of the resource being located on the computer system the user is using. But a person skilled in the art will recognize that the times used to control access to a resource can use a standard time, such as Coordinated Universal Time, or UTC. Such an embodiment can be more useful where the user might not be local to the resource (for example, the network embodiment shown and discussed below with reference to FIG. 7). If the user is not local to the resource, there are two time zones to consider: the time local to the resource, and the remote time (where the user is located and making the request). With multiple distributed users of the resource, the picture can become even more complicated. The use of a standard time, such as UTC, can simplify implementation and management of time-based access. Company policy can determine which time zone should apply in determining whether the user is to be granted the requested level of access:

the time zone where the user is located, the time zone of the resource, or some other time zone, such as UTC.

Figure 3:
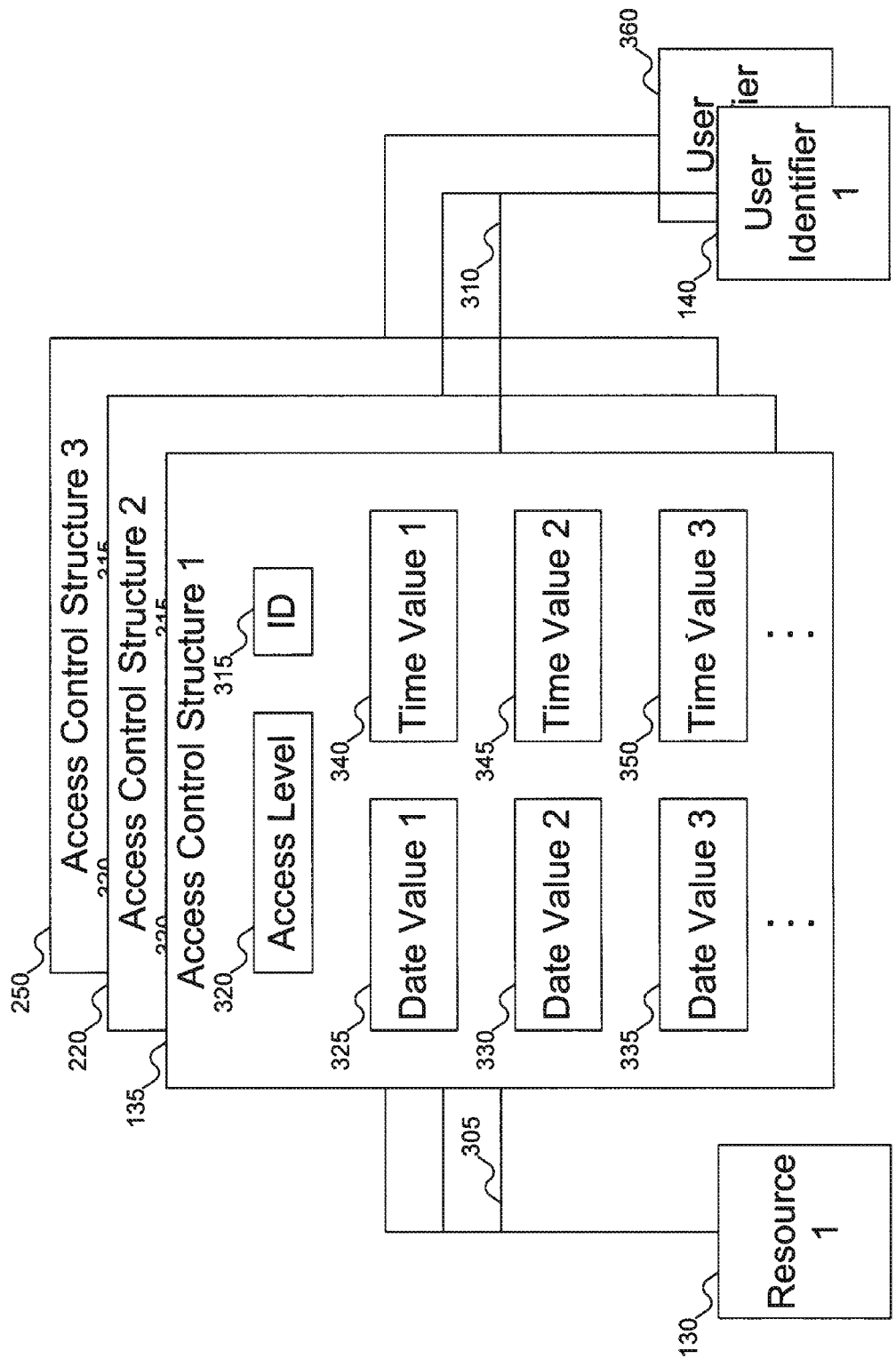
FIG. 3 shows details of the access control structure of FIG. 1.

Once the access control structures are established, the access control structures can be linked to the various resources and user identifiers. FIG. 3 shows how this can be implemented. In FIG. 3, three access control structures are shown, along with one resource and two user identifiers. A person skilled in the art will recognize that there can be any number of access control structures, resources, and user identifiers in the system.

Access control structure 135 is shown linked to resource 130 using link 305, linked to user ID 140 using link 310. While FIG. 3 shows links 305 and 310 as lines connecting access control structure 135 with resource 130 and user identifier 140, a person skilled in the art will recognize that the link can be stored in other ways. For example, access control structure 135 can include a field that includes an identifier for each of resource 130 and user identifier 140. Or resource 130 can include a data structure like structure 405, which that includes entries for various users (such as user identifier 140), such as that shown in FIG. 4A. If the access level is removed from access control structures 135, 220, and 250 (so that the access control structures only identify dates and/or times for access), then resource 130 can include a data structure like structure 410, which can includes entries for various users (such as user identifier 140) and specifying the access level, such as that shown in FIG. 4B.

Returning to FIG. 3, access control structure 135 (and other access control structures, like access control structures 220 and 250) can include ID 315. ID 315 can be used to uniquely identify a specific access control structure (for example, as shown in structures 405 and 410 of FIGS. 4A and 4B). Access control structure 135 can further include access level 320, which identifies the access level that access control structure 135 can grant to a user.

Access control structure 135 can also include date values 325, 330, and 335 and time values 340, 345, and 350. Date values 325, 330, and 335 specify dates on which access control structure 135 applies; time values 340, 345, and 350 specify times during the day in which access control structure 135 applies (limited, of course, to the dates specified in date values 325, 330, and 335). As seen in the examples of FIGS. 2A-2C, date values 325, 330, and 335 can be calendar dates or days of the week. While access control structure 135 shows three pairs of date values and time values, a person skilled in the art will recognize that there can be any number of date values and time values, as seen in the examples of FIGS. 2A-2C. Further, if one of the date value and/or time value can apply to all entries in access control structure 135, then that value can be used once and "copied" to the other values. Or, if the value can be implicitly derived (for example, an access control structure that applies only during the business week, or during all hours of the day), then that value can be omitted.

So, when the user identified by user identifier 140 requests access to resource 130, access control structures 135 and 220 are both checked to see whether the user is to be granted the requested level of access. When the user identified by user identifier 355 requests access to resource 130, access control structure 250 can be applied. As can be seen, more than one access control structure can be applicable given any combination of a resource and user identifier. Assuming that resource 130 represented the accounting folder, user identifier 140 identified the accounting employee, and user identifier 355 identified the auditor, FIG. 3 could be interpreted to show an implementation of the access control example shown and described above with reference with FIGS. 2A-2C.

A person skilled in the art will recognize that decisions to grant or deny user requests to access resources are independent. That is, the decision to grant or deny one request does not impact the decision to grant or deny another request, by either the same or a different user. A user might be denied access to one resource at one time, but be granted access to another resource at about the same time. The access control structures define the appropriate circumstances for time-based allowance, and each request is decided on its own merits.

Figure 5:
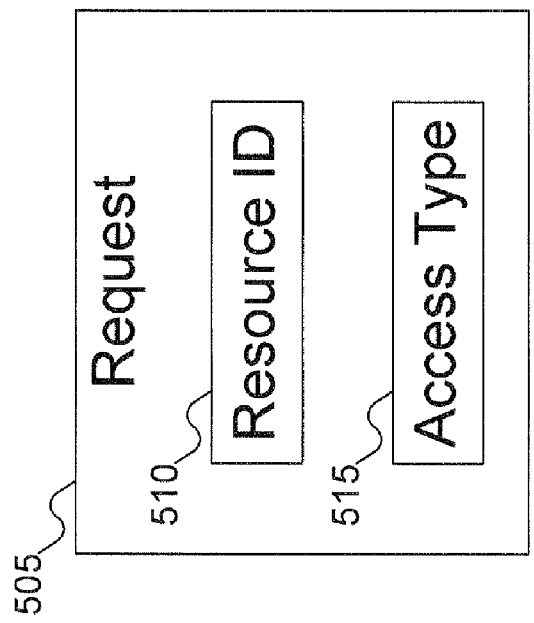
FIG. 5 shows details of a request to access the resource of FIG. 1 with a time-based access control.

FIG. 5 shows details of a request to access the resource of FIG. 1 with a time-based access control. In FIG. 5, request 505 is shown, requesting access to resource 130 (shown by resource identifier 510). Request 505 can also include the level of access 515 to the resource desired by the user. As discussed above, this level of access 515, or access type, can include read-only access, read/write access, or any other level of access appropriate to the type of resource. For example, if the resource is an application, the requested level of access 515 might include being able to execute the resource, along with read and/or write access to various data files associated with the resource.

Figure 6:
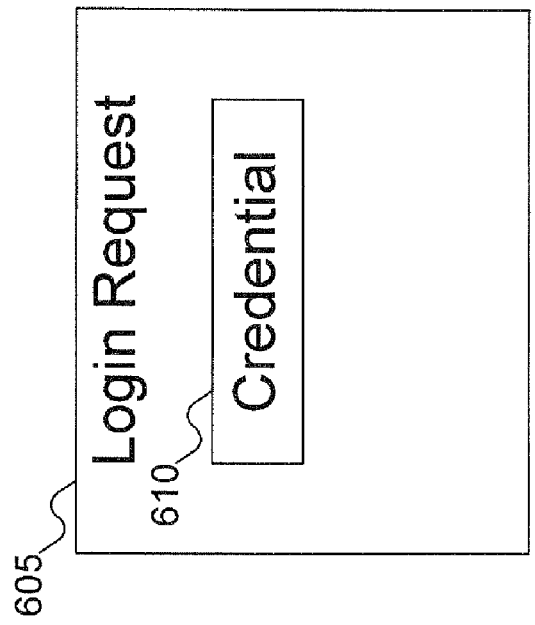
FIG. 6 shows details of a login request to log into the computer system of FIG. 1.

In contrast to the request of FIG. 5, FIG. 6 shows details of a login request to log into the computer system of FIG. 1. As is typical of login requests, login request 605 includes credential 610: for example, the username of the user and a password. Credential 610 is used to determine whether the user is granted access to the computer system as a whole, without regard to individual resources available on or via the computer system.

Figure 7:
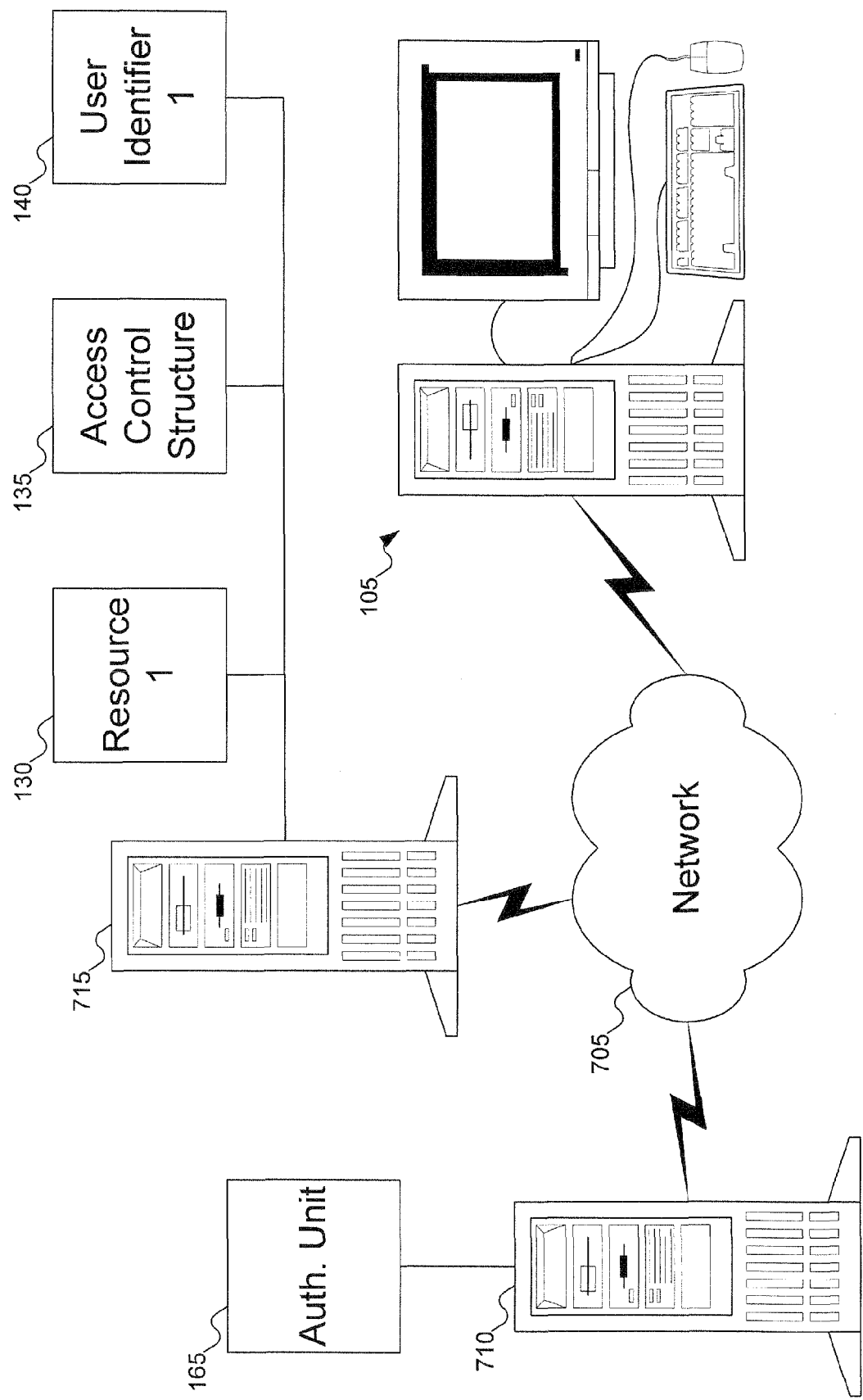
FIG. 7 shows a networked system including a resource with a time-based access control.

FIG. 7 shows a networked system including a resource with a time-based access control. In contrast to FIG. 1, where a single computer is responsible for all interaction with the user, in FIG. 7, the user is using computer system 105, which is connected via network 705 to other computers, including computers such as authentication server 710 and resource server 715. Network 705 can be any variety of network. For example, network 705 can be a Local Area Network (LAN), a Wide Area Network (WAN), a Metropolitan Area Network (MAN), or a world-wide network, such as the Internet. Further, network 705 can be an Ethernet (e.g., Megabit or Gigabit Ethernet) network, or a wireless network utilizing Bluetooth or any of the IEEE 802.11a/b/g standards, among others. Finally, network 705 can also include multiple different interconnected networks of different type.

By including multiple computers distributed across network 705, responsibility for managing requests can be distributed among the machines. For example, authentication server 710 can be responsible for authenticating the user (for example, during login request 605 in FIG. 6), and can include authorization unit 165 to further determine whether the user is authorized to access resource 130. Resource server 715 can include resource 130, access control structure 135, and user identifier 140, to support determining whether the user is permitted to access resource 130. (Although not shown in FIG. 7, resource server 715 can also include clock 145, access control logic 150 and access control structure selector 155, and request receiver 160, to facilitate determining whether to grant access to the requested resource.)

Figure 8A:
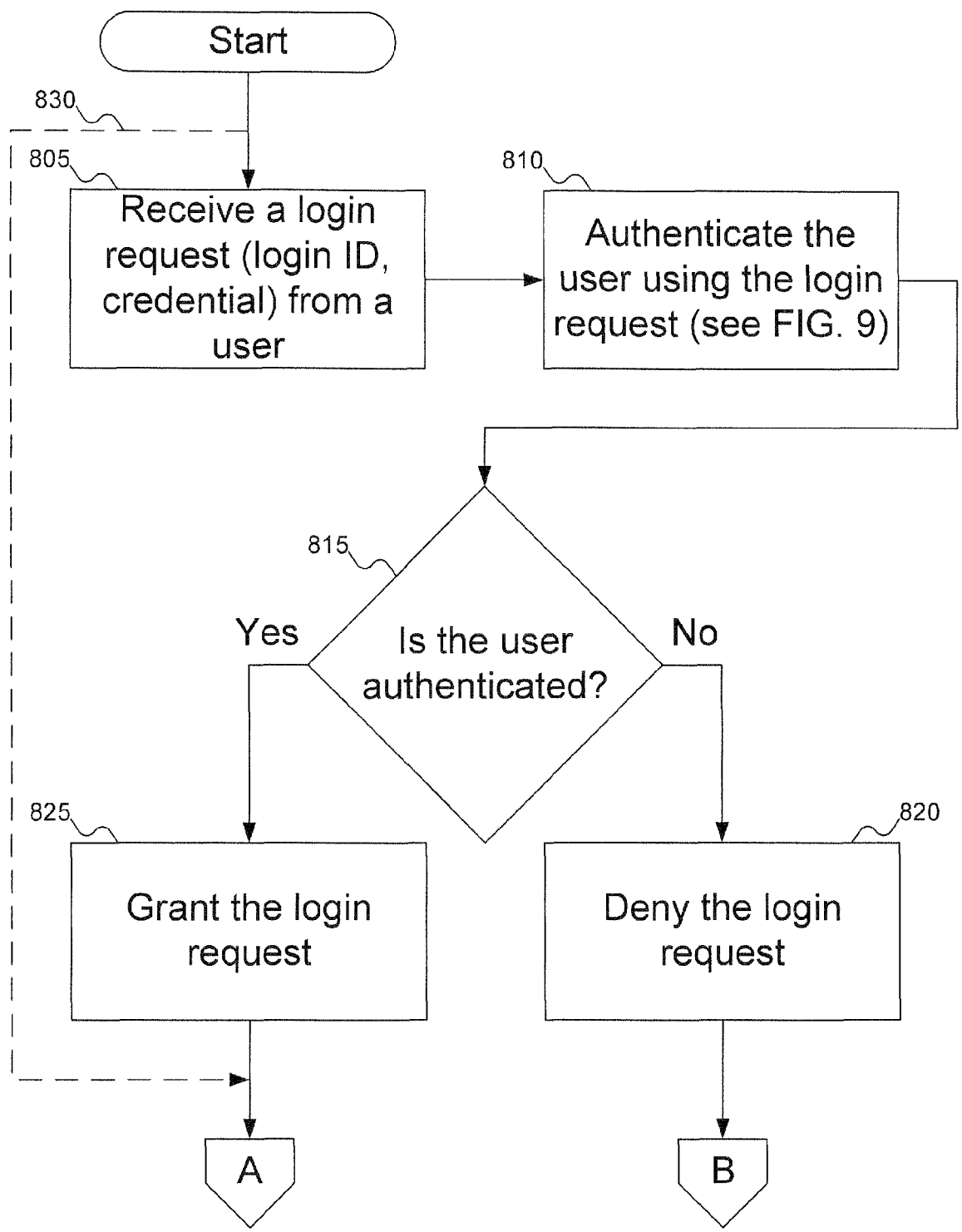
FIGS. 8A-8C show a flowchart of a procedure to perform time-based authorization of access to a resource in the computer system of FIG. 1.
Figure 8B:
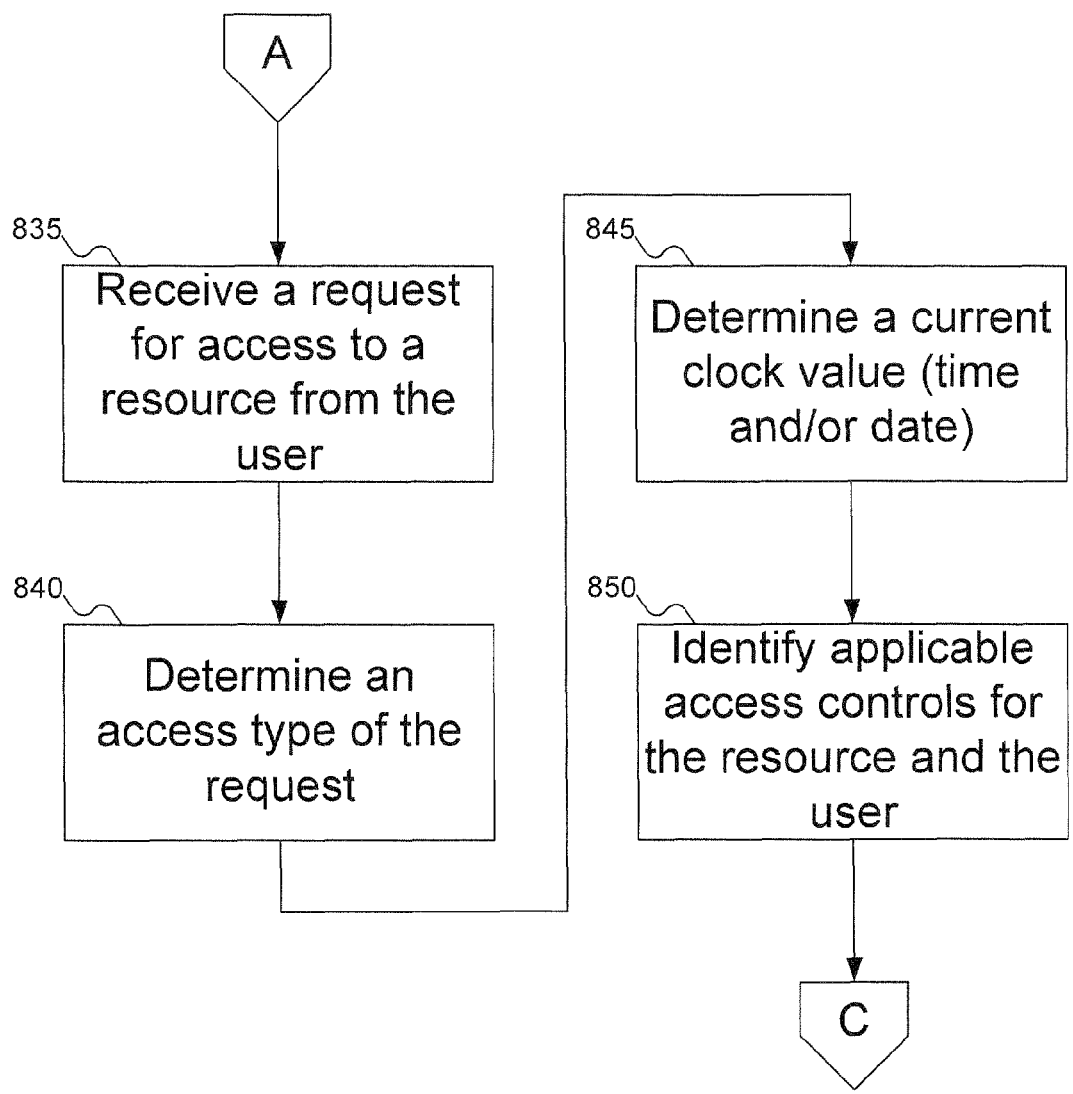
Figure 8C:
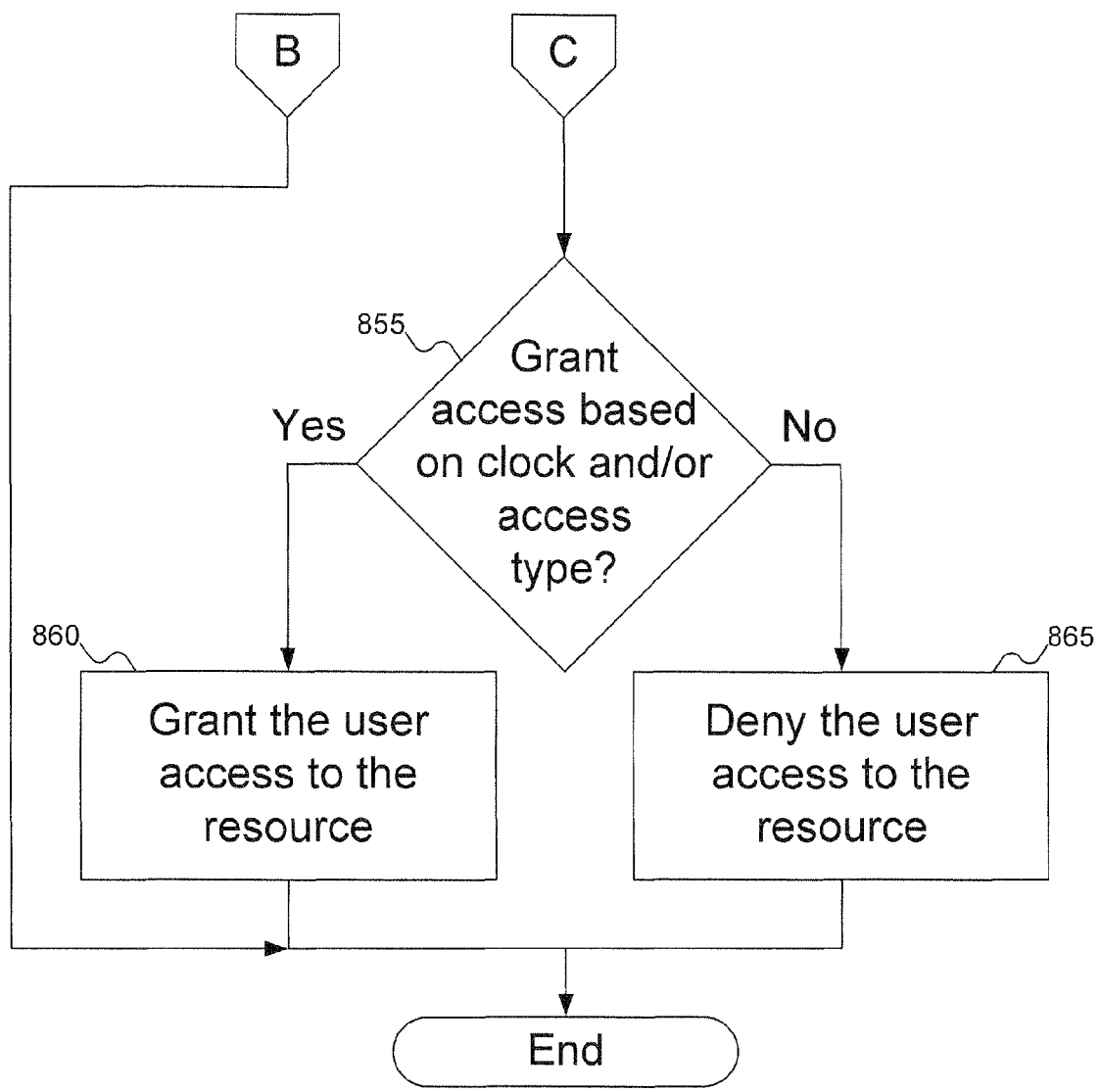

FIGS. 8A-8C show a flowchart of a procedure to perform time-based authorization of access to a resource in the computer system of FIG. 1. In FIG. 8A, at block 805, the system receives a login request from a user. At block 810, the system attempts to authenticate the login request. Details of the authentication process are shown and discussed below with reference to FIG. 9. At block 815, the system determines whether the login request was authenticated. If the login request was not authenticated, then at block 820, the login request is denied. Processing then terminates (as shown in FIG. 8C). If the login request was authenticated, then at block 825 the login request is granted. Note that blocks 805-825 are optional, as shown by arrow 830. Depending on the implementation of the system, the user might not need to be authenticated to the system, or the user might have been authenticated at some time prior to the time-based request for the resource.

At block 835 (FIG. 8B), the system receives a request for the resource. At block 840, the system determines the access type (that is, the access level requested). At block 845, the system determines a current clock value. As shown and discussed above with reference to FIGS. 1-3, the current clock value can indicate the current time of the day, the current day of the week, or the current calendar date, as specified by the applicable access controls. At block 850, the system identifies access controls that are applicable to the requested resource. As shown and discussed above with reference to FIGS. 1-4B, the applicable access controls can be determined using a number of factors, including the identity of the user, the requested resource, the requested access level, and the current clock value.

At block 855 (FIG. 8C), the system determines whether to grant or deny the access request. If the decision is to grant the access request, then at block 860 the system grants the request to access the resource. Otherwise, at block 865 the system denies the request to access the resource.

Figure 9:
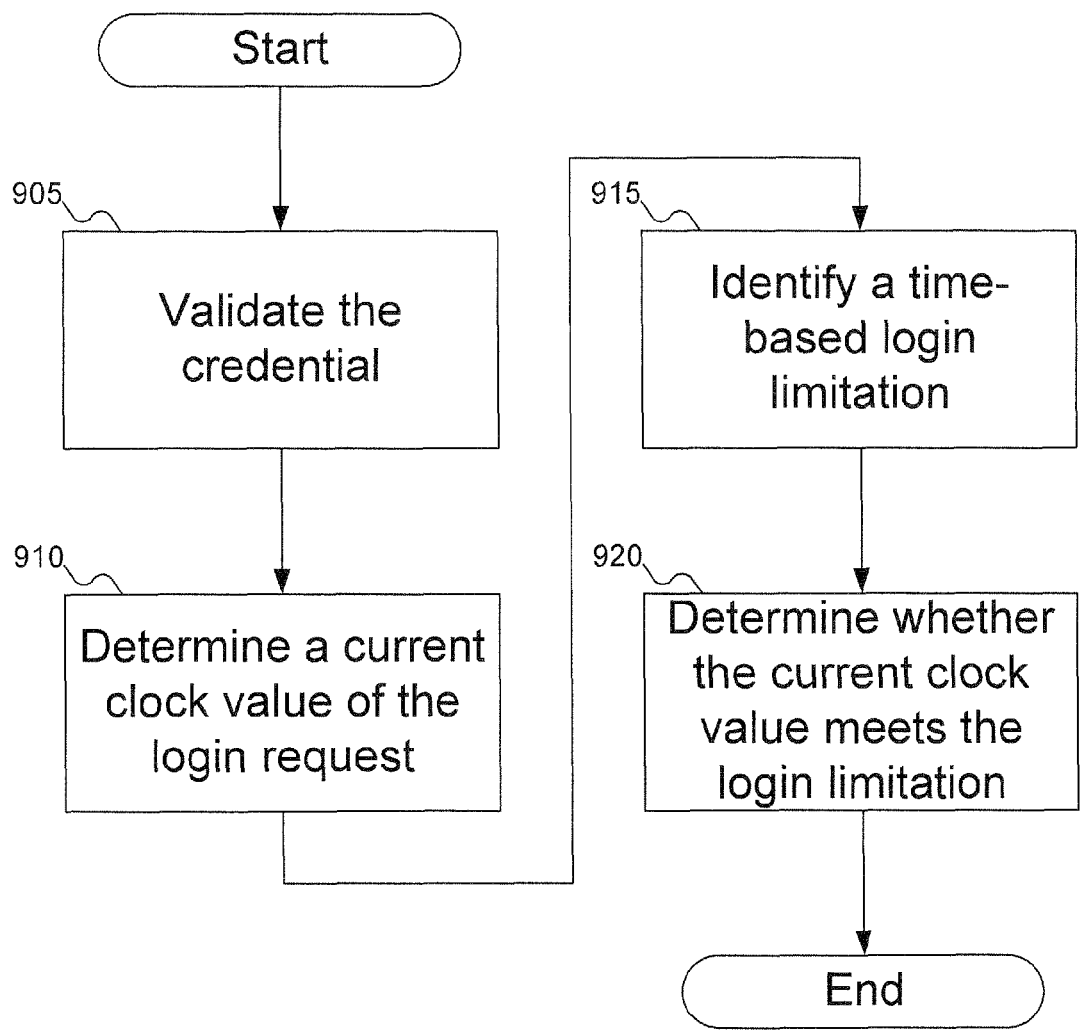
FIG. 9 shows a flowchart of a procedure to perform a time-based login to the computer system of FIG. 1.

FIG. 9 shows a flowchart of a procedure to perform a time-based login to the computer system of FIG. 1. In FIG. 9, at block 905, the system validates the credential provided by the user to log in to the system. At block 910, the system determines a current clock value for the login request. At block 915, the system identifies a time-based login limitation for the user, if any exists. At block 920, the system determines if the current clock value meets the time-based login limitation. (If there is no time-based login limitation, then the condition in block 920 is always satisfied.) Assuming that the login request satisfies all of blocks 905-920, then the login request is authenticated.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, instructions, etc. which, when accessed by a machine, result in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a machine;
a resource accessible via the machine to which a user wants access;
at least one access control structure associated with the resource and a group identifier, the access control structure one of a plurality of access control structures associated with the resource and a plurality of group identifiers, the access control structure including time values when access to the resource is to be granted for a particular access level, said access level drawn from a set including read access, write access, execute access, read/write access, read/execute access, write/execute access, and read/write/execute access, the group identifier identifying a group including at least said user identified by a user identifier and a second user identified by a second user identifier; and
an access control logic to determine whether said user, as a member of group identified by said group identifier, is to be granted access to the resource based on the access control structures and a current clock value.

2. An apparatus according to claim 1, further comprising a clock operative to generate said current clock value.

3. An apparatus according to claim 1, further comprising a request receiver to receive a request from said user to access the resource.

4. An apparatus according to claim 3, wherein the access control logic is operative to grant said user, as a member of said group identified by said group identifier, access to the resource if said current clock value satisfies a time value in one of the access control structures.

5. An apparatus according to claim 4, wherein:
the request receiver is operative to receive said request from said user to access the resource using an access type; and
the access control logic is operative to grant said user, as a member of said group identified by said group identifier, access to the resource if said current clock value satisfies said time value in one of the access control structures and said access type matches the access level in the one of the access control structures.

6. An apparatus according to claim 4, wherein the access control logic is operative to deny said request if the access control structures do not permit said user, as a member of said group identified by said group identifier, access to the resource.

7. An apparatus according to claim 1, wherein:
the access control logic includes an access control structure selector operative to select applicable access control structures from the at least one access control structure based on said current clock value; and
the access control logic is operative to determine whether said user, as a member of said group identified by said group identifier, is to be granted access to the resource based on said applicable access control structures and said current clock value.

8. An apparatus according to claim 1, further comprising an authorization unit to process a login request from said user.

9. An apparatus according to claim 1, wherein the resource is remote from the machine.

10. An apparatus according to claim 1, further comprising a second access control structure of said plurality of access control structures associated with the resource and a second group identifier of said plurality of group identifiers, wherein said second group identifier identifies a second group including at least said user identified by said user identifier and a third user identified by a third user identifier.

11. A method for controlling user access to a resource in a computer, the method comprising:
receiving a request from a user to specifically access the resource using an access type, the user a member of a group including at least the user identified by a user identifier and a second user identified by a second user identifier;
determining a current clock value;
identifying at least one access controls applicable to the resource for the group based on the current clock value, the access control one of a plurality of access controls associated with the resource and a plurality of group identifiers, each of the access controls including an access level, the access level drawn from a set including read access, write access, execute access, read/write access, read/execute access, write/execute access, and read/write/execute access; and
granting the user access to the resource if the applicable access controls in relation to the current clock value and the applicable access level permit the group access to the resource using the access type.

12. A method according to claim 11, further comprising denying the user access to the resource if the applicable access controls do not permit the group access to the resource.

13. A method according to claim 11, further comprising receiving a login request from the user prior to receiving the request.

14. A method according to claim 13, wherein receiving a login request includes:
determining a second current clock value of the login request;
identifying a time-based login limitation for the user; and
determining if the user is permitted to login based on the second current clock value and the time-based login limitation for the user.

15. A method according to claim 11, wherein:
determining a current clock value includes determining a current date; and
identifying access controls applicable to the resource for the group based on the current clock value includes identifying access controls applicable to the resource for the group based on the current date.

16. A method according to claim 11, wherein:
determining a current clock value includes determining a current time; and
identifying access controls applicable to the resource for the group based on the current clock value includes identifying access controls applicable to the resource for the group based on the current time.

17. A method according to claim 1, further comprising:
identifying a third access control applicable to the resource for a second group based on the current clock value, wherein the user is a member of the second group including the user and a third user; and
granting the user access to the resource if the third access control in relation to the current clock value and the applicable access level permits the third group access to the resource using the access type.

18. A memory for storing data for access on a computer system, comprising:
a data structure stored in the memory, the data structure including:
an access level for a specific resource, the access level drawn from a set including read access, write access, execute access, read/write access, read/execute access, write/execute access, and read/write/execute access;
a group identifier identifying a group including at least a user identified by a user identifier and a second user identified by a second user identifier; and
a clock interval during which the access level for said resource is permitted,
wherein the data structure is one of a plurality of access control structures for the resource associated with one of a plurality of group identifiers.

19. A memory according to claim 18, wherein the clock interval includes a time interval identifying hours of a day when the access level for said resource is permitted.

20. A memory according to claim 19, wherein the clock interval further includes a date interval identifying dates on a calendar when the access level for said resource is permitted.

21. A memory according to claim 18, wherein the clock interval includes a date interval identifying dates on a calendar when the access level for said resource is permitted.

22. A memory according to claim 18, wherein the data structure further includes an identifier for the data structure.

23. A memory according to claim 18, wherein the data structure further includes an identifier for said resource.

24. A memory according to claim 18, the memory further comprising a second data structure stored in the memory, the second data structure comprising:
- a second access level for a specific resource, the second access level drawn from a set including read access, write access, execute access, read/write access, read/execute access, write/execute access, and read/write/execute access;
- a second group identifier identifying a second group including at least the user identified by the user identifier and a third user identified by a third user identifier; and
- a clock interval during which the access level for said resource is permitted.

25. An article, comprising a non-transitory storage medium, said non-transitory storage medium having stored thereon instructions, that, when executed by a machine, result in:
- receiving a request from a user to specifically access a resource using an access type, the user a member of a group including at least the user identified by a user identifier and a second user identified by a second user identifier;
- determining a current clock value;
- identifying at least one access controls applicable to the resource for the group based on the current clock value, the access control one of a plurality of access controls associated with the resource and a plurality of group identifiers, each of the access controls including an access level, the access level drawn from a set including read access, write access, execute access, read/write access, read/execute access, write/execute access, and read/write/execute access; and
- granting the user access to the resource if the applicable access controls in relation to the current clock value and the applicable access level permit the group access to the resource using the access type.

26. An article according to claim 25, said non-transitory storage medium having stored thereon further instructions that, when executed by said machine, result in denying the user access to the resource if the applicable access controls do not permit the group access to the resource.

27. An article according to claim 25, said non-transitory storage medium having stored thereon further instructions that, when executed by said machine, result in receiving a login request from the user prior to receiving the request.

28. An article according to claim 27, wherein receiving a login request includes:
- determining a second current clock value of the login request;
- identifying a time-based login limitation for the user; and
- determining if the user is permitted to login based on the second current clock value and the time-based login limitation for the user.

29. An article according to claim 25, wherein:
- determining a current clock value includes determining a current date; and
- identifying access controls applicable to the resource for the group based on the current clock value includes identifying access controls applicable to the resource for the group based on the current date.

30. An article according to claim 25, wherein:
- determining a current clock value includes determining a current time; and
- identifying access controls applicable to the resource for the group based on the current clock value includes identifying access controls applicable to the resource for the group based on the current time.

31. An article according to claim 25, said non-transitory storage medium having stored thereon further instructions that, when executed by said machine, result in:
- identifying a third access control applicable to the resource for a second group based on the current clock value, wherein the user is a member of the second group including the user and a third user; and
- granting the user access to the resource if the third access control in relation to the current clock value and the applicable access level permits the third group access to the resource using the access type.

* * * * *